United States Patent
Maxwell et al.

(10) Patent No.: US 9,232,265 B2
(45) Date of Patent: Jan. 5, 2016

(54) METHOD, APPARATUS AND SYSTEM FOR TRANSITIONING AN AUDIO/VIDEO DEVICE BETWEEN A SOURCE MODE AND A SINK MODE

(75) Inventors: Conrad Arlo Maxwell, Herriman, UT (US); Lance Davies, Loveland, CO (US); Graeme P. Jones, Tampa, FL (US); Glenn L. Marks, Corona, CA (US); Jonathan Regalado-Hawkey, Woolston (GB); Christian Rudel, Wunstorf (DE)

(73) Assignee: Lattice Semiconductor Corporation, Portland, OR (US)

( * ) Notice: Subject to any disclaimer, the term of this patent is extended or adjusted under 35 U.S.C. 154(b) by 709 days.

(21) Appl. No.: 13/434,273

(22) Filed: Mar. 29, 2012

(65) Prior Publication Data

US 2012/0274857 A1  Nov. 1, 2012

Related U.S. Application Data

(60) Provisional application No. 61/470,431, filed on Mar. 31, 2011.

(51) Int. Cl.
| | | |
|---|---|---|
| *G06F 3/00* | (2006.01) | |
| *H04N 21/4363* | (2011.01) | |
| *H04L 12/12* | (2006.01) | |
| *H04L 12/28* | (2006.01) | |
| *H04N 5/775* | (2006.01) | |
| *H04N 21/442* | (2011.01) | |
| *G06F 3/14* | (2006.01) | |
| *G09G 5/00* | (2006.01) | |

(52) U.S. Cl.
CPC ............ *H04N 21/43635* (2013.01); *G06F 3/14* (2013.01); *G09G 5/006* (2013.01); *H04L 12/12* (2013.01); *H04L 12/2829* (2013.01); *H04N 5/775* (2013.01); *H04N 21/44227* (2013.01); *G09G 2330/02* (2013.01); *G09G 2370/12* (2013.01); *G09G 2370/22* (2013.01); *H04L 2012/2849* (2013.01); *Y02B 60/34* (2013.01)

(58) Field of Classification Search
None
See application file for complete search history.

(56) References Cited

U.S. PATENT DOCUMENTS

| | | | | |
|---|---|---|---|---|
| 6,618,773 B1 * | 9/2003 | Chang et al. | ..................... | 710/16 |
| 7,761,709 B2 * | 7/2010 | Choi | ............................. | 713/168 |
| 7,827,319 B2 * | 11/2010 | Kimura et al. | ..................... | 710/5 |

(Continued)

OTHER PUBLICATIONS

"International Search Report and Written Opinion of the International Searching Authority, for International Patent Application No. PCT/US2012/031463", (Oct. 31, 2012), Whole Document.

(Continued)

*Primary Examiner* — Henry Tsai
*Assistant Examiner* — Christopher Bartels
(74) *Attorney, Agent, or Firm* — Fenwick & West LLP

(57) ABSTRACT

Techniques and mechanisms for determining an operation mode of an audio-video (AV) device. In an embodiment, communication logic of the AV device may be configured at different times for different ones of a plurality of operation modes including an AV source operation mode for providing AV information to another device and an AV sink operation mode for receiving AV information from another device. In response to a detected event, control logic initializes the communication logic of the AV device into a default mode which prevents operation of the communication logic as an AV source.

18 Claims, 7 Drawing Sheets

(56) References Cited

U.S. PATENT DOCUMENTS

| | | | |
|---|---|---|---|
| 7,889,201 B2* | 2/2011 | Yato | 345/501 |
| 7,945,708 B2* | 5/2011 | Ohkita | 710/14 |
| 7,979,910 B2* | 7/2011 | Mantani | 726/26 |
| 7,995,043 B2* | 8/2011 | Noorbakhsh et al. | 345/204 |
| 8,019,906 B2* | 9/2011 | Lee et al. | 710/14 |
| 8,095,714 B2* | 1/2012 | Huo et al. | 710/110 |
| 8,266,335 B2* | 9/2012 | Kitano et al. | 710/15 |
| 8,275,914 B2* | 9/2012 | Kim et al. | 710/15 |
| 8,447,158 B2* | 5/2013 | Yamamoto | 386/200 |
| 8,453,008 B2* | 5/2013 | Kimoto | 714/4.1 |
| 8,484,387 B2* | 7/2013 | Kim et al. | 710/11 |
| 8,510,483 B2* | 8/2013 | Kawai | 710/33 |
| 8,683,087 B2* | 3/2014 | Connolly | 710/11 |
| 8,745,251 B2* | 6/2014 | Zou et al. | 709/230 |
| 2007/0263669 A1* | 11/2007 | Maginity et al. | 370/503 |
| 2008/0205306 A1* | 8/2008 | Saito | 370/294 |
| 2008/0270635 A1* | 10/2008 | Nakahama | 710/8 |
| 2009/0046690 A1* | 2/2009 | Hsieh | 370/342 |
| 2009/0083825 A1* | 3/2009 | Miller et al. | 725/151 |
| 2009/0141180 A1* | 6/2009 | Kondo et al. | 348/723 |
| 2009/0174817 A1* | 7/2009 | Sato et al. | 348/554 |
| 2010/0131782 A1* | 5/2010 | Higuchi | 713/310 |

OTHER PUBLICATIONS

"Preliminary Report on Patentability (Chapter I of the Patent Cooperation Treaty), for International Patent Application No. PCT/US2012/031463", (Oct. 10, 2013), Whole Document.

Extended European Search Report, European Application No. 12762781.8, Aug. 13, 2014, 7 pages.

* cited by examiner

METHOD, APPARATUS AND SYSTEM FOR TRANSITIONING AN AUDIO/VIDEO DEVICE BETWEEN A SOURCE MODE AND A SINK MODE

RELATED APPLICATIONS

This application claims priority from Provisional Application Ser. No. 61/470,431, filed Mar. 31, 2011, entitled "METHOD, APPARATUS AND SYSTEM FOR PROVIDING A BIDIRECTIONAL OPERATING MODE TO EXCHANGE AUDIO/VIDEO CONTENT", the teaching of which is incorporated herein by reference.

BACKGROUND

1. Technical Field

Embodiments relate generally to techniques for exchanging audio/video information. More particularly, certain embodiments provide techniques for controlling an audio/video device to selectively receive or send audio/video information.

2. Background Art

The size of computers and other audio/video (AV) capable electronic devices continue to scale with successive improvements in integrated circuit (IC) fabrication techniques. Consequently, there is a general trend toward a wider variety of AV devices, notably smaller AV devices, implementing functionality to support higher throughput and/or higher quality of AV information.

Certain conventional AV devices include a High-Definition Multimedia Interface (HDMI) connector or other such hardware for coupling to some other device, where the AV device operates as a source to provide AV information to the other device via the connector. Typical examples of conventional AV sources include a camcorder, digital camera, personal computer (e.g. tablet, notebook, laptop, desktop and/or the like), smart phone, video game console, DVD player, digital video recorder (DVR), set-top box, plug-in storage peripheral or other such device which is capable of sending AV information to some other device.

Other conventional AV devices operate as a sink to receive AV information from another device via such coupling hardware. Typical examples of conventional AV sinks include a television, monitor, display, home theater receiver, personal computer, projector or other such device which is capable of receiving AV information from some AV source.

One consequence of the current trends in AV technology is smaller and/or higher-capacity AV devices placing an increasing premium on the area which is taken up by multiple AV connectors. Another consequence of current trends is the increasing variety of combinations of AV devices which may be coupled to one another to exchange AV information. Due to such consequences, systems which exchange AV information between electronic devices are increasingly prone to inefficiencies in how such devices are to couple to and communicate with one another.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Figure 1:
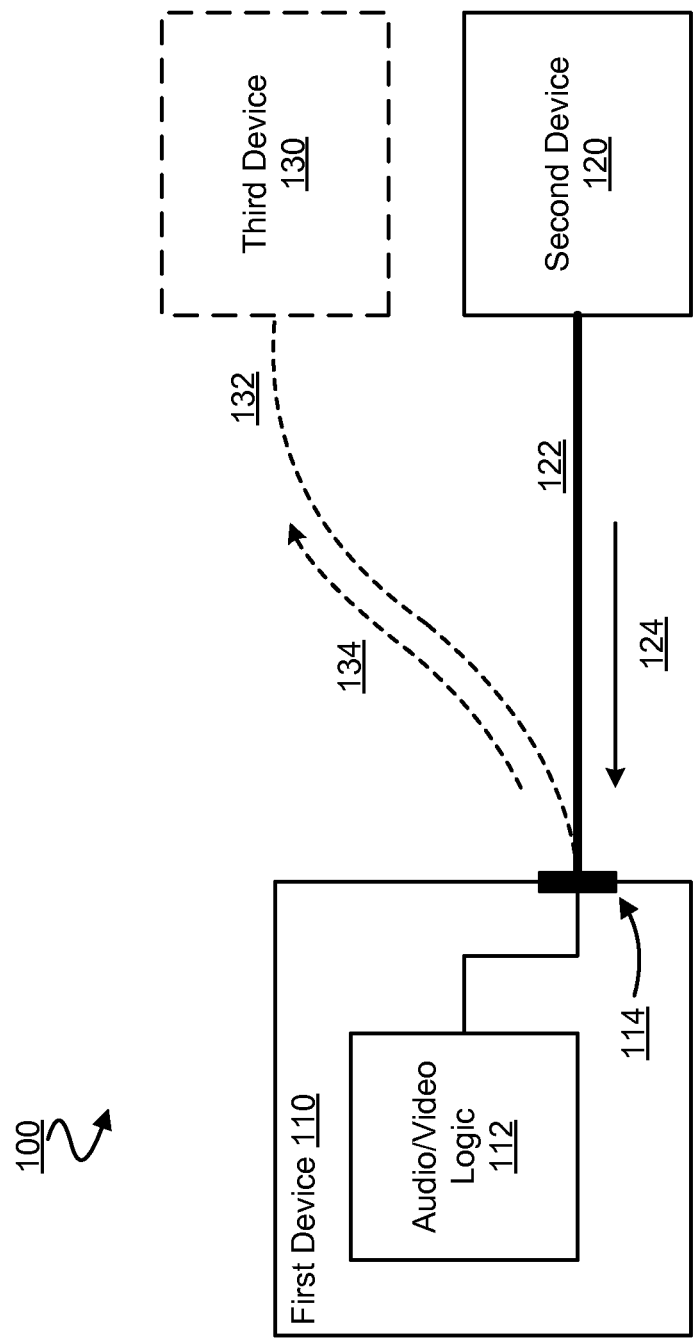
FIG. 1 is a block diagram showing elements of a system for exchanging audio/video data according to an embodiment.

Embodiments discussed herein variously make, use or otherwise provide circuit logic to selectively control an audio/video (or "AV") device for operation at different times in various ones of a plurality of operation modes. The plurality of operation modes may include what is referred to herein as an "AV Sink" operation mode, for the AV device (also referred to herein as simply "device") to be a sink for receiving AV information from another AV device via a connector, and what is referred to herein as an "AV Source" operation mode, for the AV device to be a source for providing AV information to another AV device via the same connector. In an embodiment, the AV device includes the connector. In an alternate embodiment, the AV device may operate in a system which includes the connector—e.g. where the connector is to couple the system with some external device for an exchange of AV information.

As used herein, "audio/video" or "AV" refers to the characteristic of relating to either audio content or video content, or relating to both audio content and video content. For example, AV information may include some or all of audio data and/or control information and video data and/or control information. In an embodiment, an AV device may, in addition to exchanging AV information with another device, be operable to render audio content and/or video content for a user, although certain embodiments are not limited in this regard.

An AV device according to an embodiment includes communication logic to exchange AV data according to some interface standard. By way of illustration and not limitation, such communication logic may exchange AV data via a connector which is compatible with one or more of an HDMI standard such as the HDMI 1.4 standard released May 28, 2009 by HDMI Licensing, LLC of Sunnyvale, Calif., a Mobile High-Definition Link (MHL) standard such as the MHL 1.0 specification released Jun. 30, 2010 by the MHL Consortium of Sunnyvale, Calif., a Digital Visual Interface (DVI) standard such as the DVI 1.0 standard released Apr. 2, 1999 by the Digital Display Working Group of Vancouver, Wash., a DisplayPort standard such as the DisplayPort 1.2 standard released Dec. 22, 2009 by the Video Electronics Standards Association of Newark, Calif. and/or the like.

In an embodiment, such communication logic may implement communications which, at different times, are compatible with different interface standards, where all such communications are via the same connector. For example, communication logic may include first logic to detect the presence of, and communicate with, an HDMI device and second logic to detect the presence of, and communicate with, an HDMI device, where the respective detection and communication functionalities of the first logic and second logic do not conflict with or otherwise impede the other. Such communication logic may, for example, be referred to as "MHL-ready HDMI," "HDMI/MHL" and/or the like. Features of various embodiments are discussed herein in the context of exchanging AV information according to an HDMI interface standard. However, such discussion may be extended to apply to any of a variety of additional or alternative interface standards for exchanging AV data, according to different embodiments.

Certain embodiments variously provide that, from either or both of a device power up and a device reset, an AV device will, by default, return to or otherwise be in a Sink mode. While in this mode such an AV device may then determine by stimulus and response or measurement means described herein that it is connected to an AV Sink device, in which case it may safely transition to an AV Source operation mode. In an embodiment, the AV device may translate back to AV Sink operation mode in response to an indication of a change in connectivity to the AV Sink device.

FIG. 1 illustrates elements of a system 100 for exchanging AV information according to an embodiment. System 100 may include a first device 110 comprising AV logic 112 to variously implement AV communications between first device 110 and one or more other devices. One embodiment may, for example, be implemented entirely within AV logic 112. Another embodiment may be implemented by first device 110 as a whole. Still another embodiment may be implemented by system 100 as a whole. Any of a variety of other embodiments may be alternatively implemented according to techniques discussed herein.

In an embodiment, first device 110 includes functionality of one or more of conventional AV source devices and/or functionality of one or more conventional AV sink devices. By way of illustration and not limitation, first device 110 may include functionality of one or more devices including, but not limited to, a personal computer (e.g. tablet, notebook, laptop, desktop and/or the like), camcorder, smart phone, video game console, television, monitor, display, set-top box, home theater receiver and/or the like.

First device 110 may include a connector 114, coupled via one or more signal lines to AV logic 112, to variously connect first device 110 to some other device of system 100 for an exchange of AV information. Connector 114 may include a plurality of channels, such as pins and/or other interconnect hardware, which are compatible with a particular AV interface standard—e.g. an HDMI standard.

In an illustrative embodiment, connector 114 may, at some point in time, couple first device 110 via an interconnect 122 to a second device 120 of system 100—e.g. for an exchange 124 of AV information from second device 120 to first device 110. The particular direction of exchange 124 is not limiting on certain embodiments, and may alternatively be in the opposite direction, where first device 110 operates as the AV Source and second device 120 operates as the AV Sink. Accordingly, second device 120 may, for example, include both logic (not shown) to implement conventional AV Source functionality or conventional AV Sink functionality. In another embodiment, second device 120 may include logic to variously provide both AV Source functionality and AV Sink functionality according to techniques described herein.

Certain embodiments variously mitigate at least one problem which might otherwise arises if two conventional AV devices are coupled to one another when those two devices are concurrently configured each for respective operation as an AV Source. Such connecting of AV Source devices to one another can risk damage to transmission hardware in either or both devices. For example, the two devices may attempt to drive power in opposite directions in the same power supply voltage channel of a connector. Alternatively, or in addition, two such devices may attempt to drive data signals in opposite directions via the same data channel of the connector. Such AV Source devices may risk driving any of a variety of other signals—e.g. hot plug detect signals, clock signals and/or the like—against one another each on some common respective channel of a connector.

AV logic 112 may limit the risk of the resulting damage in system 100 by providing a control mechanism to selectively prevent one or more aspects of AV Source functionality from being provided during operation of first device 110. By way of illustration and not limitation, AV logic 112 may selectively transition itself between a plurality of operation modes which includes an AV Source operation mode and an AV Sink operation mode. The AV Source operation mode may be for AV logic 112 to provide a particular signal to connection 114—e.g. a supply voltage, a digital data signal and/or the like. Additionally or alternatively, the AV Source operation mode may be for AV logic 112 to provide a particular amount of impedance—e.g. pull-up impedance, pull-down impedance and/or the like—for a signal line coupled to a channel of connection 114.

In an embodiment, control logic (not shown) of AV logic 112 selects one of the plurality of operation modes in response to an indication of a particular type of event at first device 110. Whether and/or how AV logic 112 might transition between operation modes may be based, for example, on whether the indicated event is a power-up event, a power-down event a reset event, and/or the like.

Whether and/or how AV logic 112 might transition between operation modes may be additionally or alternatively based on an event which detects a particular characteristic (or absence of said characteristic) regarding connectivity between connector 114 and second device 120. By way of illustration and not limitation, such a characteristic may include whether (or not) some second device 120 is providing a supply voltage at a particular channel of connector 114. For example, connector 114 may be compatible with an interface standard which stipulates that an AV Source is to provide a supply voltage to its corresponding AV Sink—e.g. the +5V output to be provided from Source to Sink according to HDMI, as on pin 18 of a 19-pin HDMI connector.

Additionally or alternatively, such a characteristic may include whether (or not) second device 120 is providing to connector 114 a hot plug detect (HPD) signal. For example, connector 114 may be compatible with an interface standard which stipulates that an AV Sink is to indicate its presence with a HPD signal to its corresponding AV Source—e.g. the HPD signal to be provided from Sink to Source according to HDMI, as on pin 19 of a 19-pin HDMI connector.

Additionally or alternatively, such a characteristic may include whether (or not) second device 120 is providing a clock signal to connector 114. For example, connector 114 may be compatible with an interface standard which stipulates that an AV Source is to provide a clock signal to an AV Sink—e.g. the DDC_SCL signal to be provided from Source to Sink according to HDMI, as on pin 15 of a 19-pin HDMI connector.

Additionally or alternatively, such a characteristic may include whether (or not) a particular amount of impedance is being provided by second device 120 for a channel of connector 114. For example, connector 114 may be compatible with an interface standard which stipulates that a particular pull-up impedance is to be implemented at an AV Sink—e.g. a 47 kΩ pull-up resistance which HDMI requires be provided at an AV Sink for a SDA line (e.g. pin 16 of a 19-pin HDMI connector).

In an embodiment, the functionality of AV logic 112 allows connector 114 to be variously coupled, decoupled and/or recoupled at different times to one or more devices, while limiting a risk of damage to hardware in system 100. By way of illustration and not limitation, connector 114 may at some point in time be decoupled from second device 120 and subsequently coupled via an interconnect 132 to some third device 130—e.g. for an exchange 134 of AV information to third device 130 from first device 110. The particular direction of exchange 134 is not limiting on certain embodiments, any may alternatively be in the opposite direction, where first device 110 operates as the AV Sink and third device 130 operates as the AV Source. In an embodiment, third device 130 is simply second device 120—e.g. where second device 120 is decoupled from and subsequently recoupled to first device 110 and/or where first device 110 and second device 120 switch AV Sink and AV Source roles for different AV information exchanges.

As shown in the discussion herein, AV logic 112 may protect various circuitry of system 100 for different successive couplings of first device 110 each to a respective device and/or for successive different AV information exchanges each between first device 110 and a respective device.

Figure 2A:
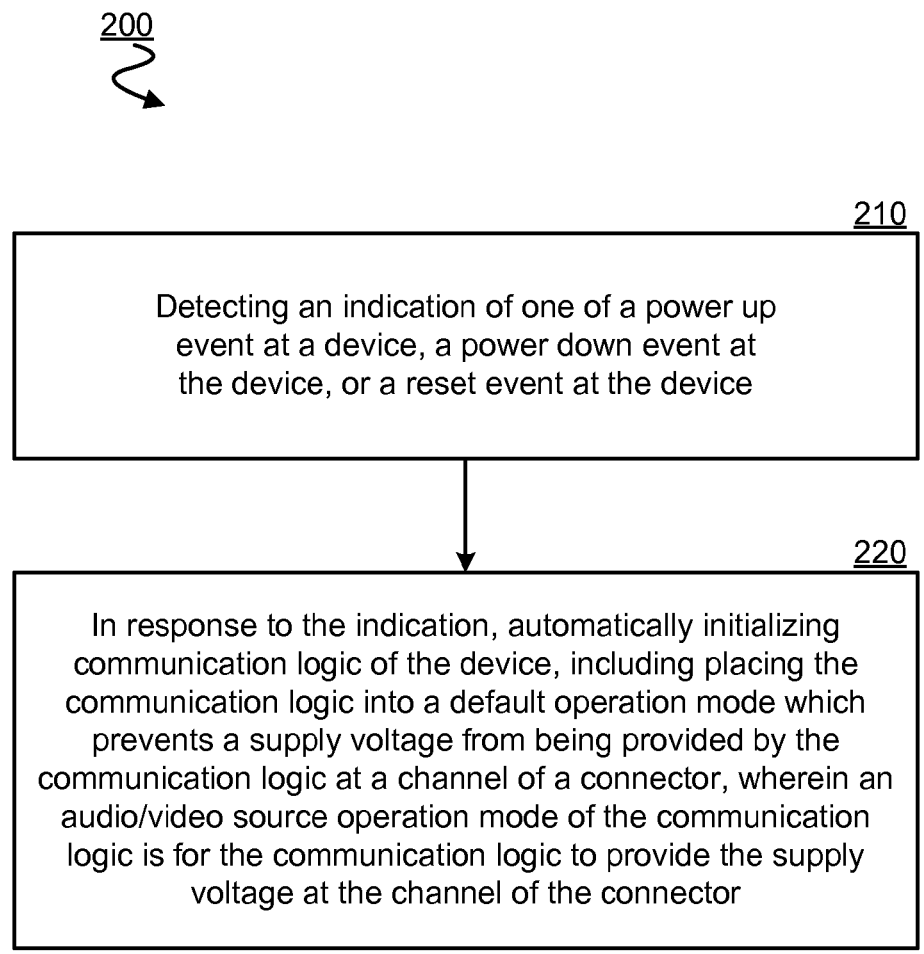
FIG. 2A is a flow diagram showing elements of a method for controlling an audio/video device according to an embodiment.

FIG. 2A illustrates elements of a method 200 for controlling operation of an AV device according to an embodiment. An AV device controlled by performing method 200 may, for example, be a device including some or all of the features of first device 110. In one embodiment, an AV device controlled by performing method 200 may merely include some or all of the features of AV logic 112—e.g. without also including other features of first device 110 such as connector 114. Features of various embodiments are discussed herein in terms of performing method 200 to control AV logic 112 within first device 110. However, such discussion may be extended to apply to any of a variety of additional or alternative AV hardware, consistent with the techniques disclosed herein.

In an embodiment, the AV device includes communication logic comprising circuitry to operate at different times in different ones of a plurality of operation modes which include an AV Source operation mode and an AV Sink operation mode. The AV Sink operation mode may, for example, be for the communication logic to receive AV data provided to the AV device via a connector—e.g. via connector 114. The AV Sink operation mode may further be for the communication logic to receive power from a first supply voltage provided via a channel of the connector. By contrast, the AV Source operation mode may be for the communication logic to send AV data from the AV device, where the AV data is sent through the connector. The AV Source operation mode may further be for the communication logic to provide a second supply voltage at the channel of the connector. In an embodiment, a level of the first supply voltage is equal to a level of the second supply voltage.

In an embodiment, method 200 includes, at 210, detecting an indication of one of a power up event at the AV device, a power down event at the device or a reset event at the AV device. The detecting at 210 may, for example, include control circuitry of AV logic 112 directly or indirectly detecting an indication sent from some agent included in or otherwise accessible to AV logic 112. By way of illustration and not limitation, first device 110 may include a power management unit, a host processor or other agent which sends to AV logic 112 a signal specifying, for example, that first device 110 is going through, has gone through, or is expected to go through a boot up or boot down operation, or otherwise to transition to or from an operative power state. In an embodiment, transitioning to or from such an operative power state may include transitioning between a first power state in which AV logic 112 is incapable of exchanging AV information via connector 114 and a second power state in which AV logic 112 is capable of exchanging AV information via connector 114. Alternatively or in addition, AV logic 112 may include detector logic to evaluate power state of AV logic 112 and/or of other components of first device 110.

The detecting at 210 may additionally or alternatively include control circuitry of AV logic 112 directly or indirectly detecting a signal from some agent, included in or otherwise accessible to AV logic 112, the signal specifying or otherwise indicating that AV logic 112 or some other component of first device 110 have been, are being, or are expected to be reset. Such a reset may flush some current state of circuit logic in favor of some predetermined baseline configuration. A reset may, for example, return some or all of first device 110 to a predetermined configuration without powering down first device 110.

In response to the indication detected at 210, method 200 may, at 220, automatically initialize communication logic of the AV device. By way of illustration and not limitation, control logic of AV logic 112 may automatically place the communication logic of AV logic 112 into a default operation mode which prevents the second supply voltage from being provided by the communication logic at the channel of the connector. In an embodiment, the default operation mode is the AV Sink operation mode. In an embodiment, the AV Source operation mode is further for the communication logic of the AV device to provide a first total amount of impedance for a data channel of the connector. In such an embodiment, the default operation mode may prevent the first total amount of impedance for the data channel from being provided by the communication logic.

Figure 2B:
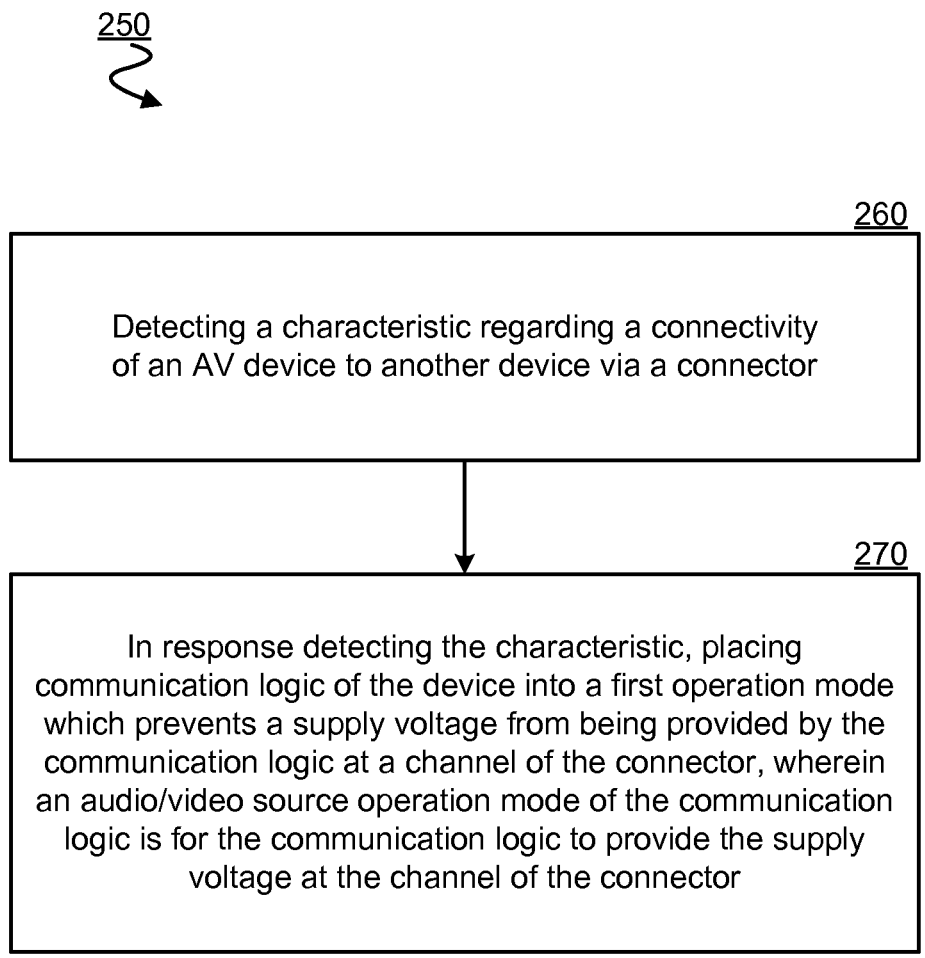
FIG. 2B is a flow diagram showing elements of a method for controlling an audio/video device according to an embodiment.

FIG. 2B illustrates elements of a method 250 for controlling operation of an AV device according to an embodiment. An AV device controlled by performing method 250 may, for example, be a device having some or all of the features of a device controlled by method 200. Method 250 may, for example, be performed after method 200—although certain embodiments are not limited in this regard. Features of various embodiments are discussed herein in terms of performing method 250 to control AV logic 112 within first device 110. However, such discussion may be extended to apply to any of a variety of additional or alternative AV hardware, consistent with the techniques disclosed herein.

Method 250 may include, at 260, detecting a characteristic regarding a connectivity of the AV device to another device via a connector—e.g. connector 114. For example, detector logic of AV logic 112 may detect connectivity to the other device via the connector—e.g. the detecting while the communication logic of the AV device is in the default operation mode of method 200. Additionally or alternatively, such detector logic of AV logic 112 may detect a change in a state of connectivity to the other device via the connector. The detecting the characteristic at 260 may, for example, include detecting an indication that the other device is providing the first supply voltage discussed with regard to method 200. Alternatively or in addition, the detecting at 260 may include detecting that the other device is providing to the connector a hot plug detect (HPD) signal, a clock signal and/or any of a variety combinations of one or more other signals. Alternatively or in addition, the detecting at 260 may include evaluating an impedance of a signal line which couples the other device to the connector.

In response to detecting the characteristic at 260, method 200 may, at 270, automatically place the communication logic of the AV device into some first operation mode which prevents a providing of the second supply voltage referred to in the discussion of method 200. The first operation mode may, for example, be the default operation mode of method 200, although certain embodiments are not limited in this regard. In placing the AV device into the first operation mode, method 250 may limit the possibility of circuit damage due to conflicting output signals from two coupled AV devices, each device attempting to operate as an AV Source.

Figure 3:
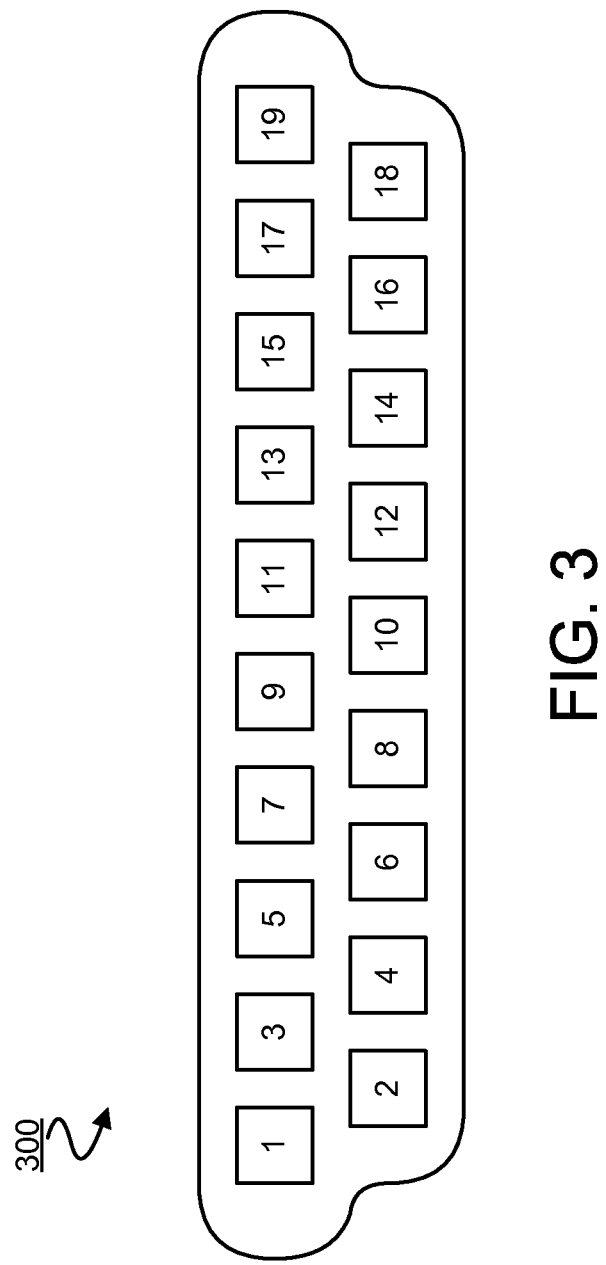
FIG. 3 is a layout diagram showing elements of a connector for exchanging audio/video data according to an embodiment.

FIG. 3 illustrates select elements of a connector 300 for exchanging AV information according to an embodiment. Connector 300 may include some or all of the features of connector 114, for example. The illustrative connector 300 is a 19-channel (e.g. 19-pin) connector which is compatible with an HDMI interface standard, although certain embodiments are not limited in this regard. Connector 300 may support AV information exchanges by any of a variety of other types of interconnect hardware—e.g. a connector including more, fewer, or alternative channels to those shown in FIG. 3—where communication via such a connector is consistent with techniques discussed herein.

The illustrative connector 300 includes interconnect hardware to support transition-minimized differential signaling (TMDS) in HDMI communication. More particularly, the respective functions of the channels in connector 300 may be assigned according to HDMI 1.4 or some other HDMI interface standard—e.g. as follows:

| Channel 1 | TMDS Data2+ |
|---|---|
| Channel 2 | TMDS Data2 Shield |
| Channel 3 | TMDS Data2− |
| Channel 4 | TMDS Data1+ |
| Channel 5 | TMDS Data1 Shield |
| Channel 6 | TMDS Data1− |
| Channel 7 | TMDS Data0+ |
| Channel 8 | TMDS Data0 Shield |
| Channel 9 | TMDS Data0− |
| Channel 10 | TMDS Clock+ |
| Channel 11 | TMDS Clock Shield |
| Channel 12 | TMDS Clock− |
| Channel 13 | Consumer Electronics Control (CEC) |
| Channel 14 | HDMI Ethernet Channel (HEC) Data |
| Channel 15 | System Clock Line (SCL) − I$^2$C Serial Clock for Display Data Channel (DDC) |
| Channel 16 | System Data (SDA) − I$^2$C Serial Data Line for DDC |
| Channel 17 | DDC/CEC/HEC Ground |
| Channel 18 | +5 V Power |
| Channel 19 | Hot Plug Detect (HPD) and/or HEC Data+ |

Potential conflict may result when two connected AV devices concurrently attempt to drive respective supply voltages and/or other signals according to the same function assignments for connector 300.

In an embodiment, an AV device including or coupled to connector 300 may implement techniques to reduce the likelihood of such conflict—e.g. techniques including some or all of the features discussed with respect to method 200 and/or method 250. By way of illustration and not limitation, control logic of such an AV device may provide that after some event—e.g. from one or more of a power up event, a power down event and a reset event—communication logic of the AV device will operate in an AV Source operation mode only after certain connectivity conditions are subsequently identified. For example, the control logic may configure the AV device after/during power up—or before/during a power down—for a default operation mode in which a functionality required for operation as an AV Source is disabled. For instance, the disabled functionality may be required for operation as an AV Source device according to the conditions of HDMI or some other interface standard.

Alternatively or in addition, the control logic may configure the AV device for an AV Sink operation mode in response to detecting a change of a characteristic regarding connectivity between the AV devices. For example, the AV device may be set to, or return to, some default AV Sink operation mode in response to an indication of a loss or absence at connector 300 of a supply voltage, an indication of a loss or absence of a HPD signal, an indication of a signal line pull-up impedance implemented by any other connected AV device, and/or an indication of a clock signal provided by any other connected AV device. Any of a variety of additional or alternative detected conditions may determine whether and/or how the AV device may be configured—or reconfigured—for operation in such a default mode. In one embodiment, the default operating mode is a SINK mode of HDMI in which the AV device is capable of operation as an AV Sink.

In an embodiment, control logic of an AV device may implement a state machine or other mechanism for transitioning the communication logic between operation modes including SINK mode and SOURCE mode. By way of illustration and not limitation, the AV device may default its communication logic to SINK mode in response to (or during) a power up of the AV device (or in response to, or during, a power down of the AV device), and/or in response to detecting that a connectivity characteristic with another AV device is absent or has changed. The AV device may variously transition between SINK mode and SOURCE mode, depending on one or more connectivity characteristics detected for connector 300. Such connectivity characteristics may include, but are not limited to, whether a +5V voltage is provided by another AV device through connector 300, and/or whether one or more signals or other connectivity characteristics (e.g. HPD, DDC pull ups, TDMS termination, etc.) indicate presence or absence of functionality of some other connected AV device as an operable Sink or operable Source.

Figure 4A:
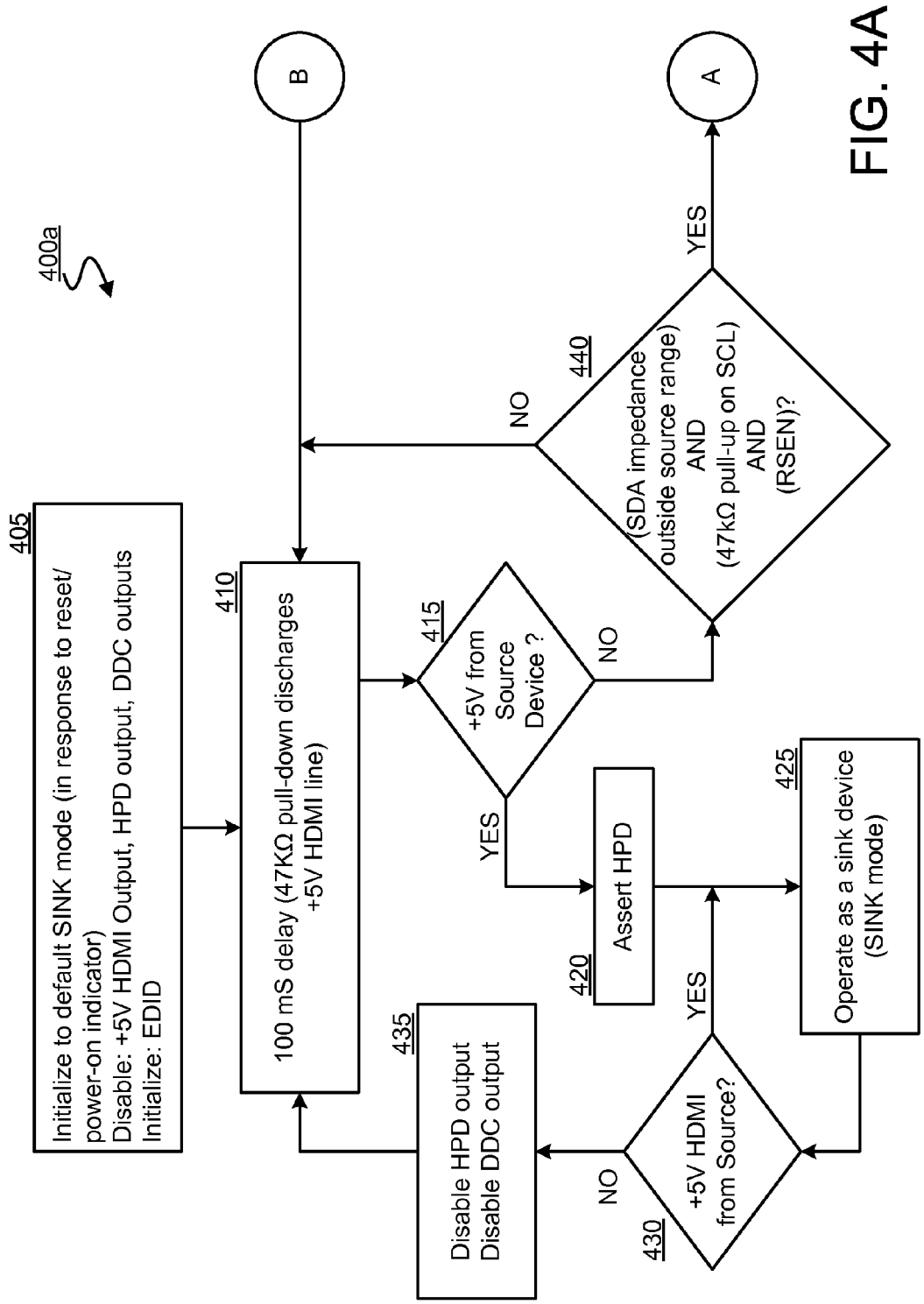
FIG. 4A is a flow diagram showing elements of a method for controlling an audio/video device according to an embodiment.
Figure 4B:
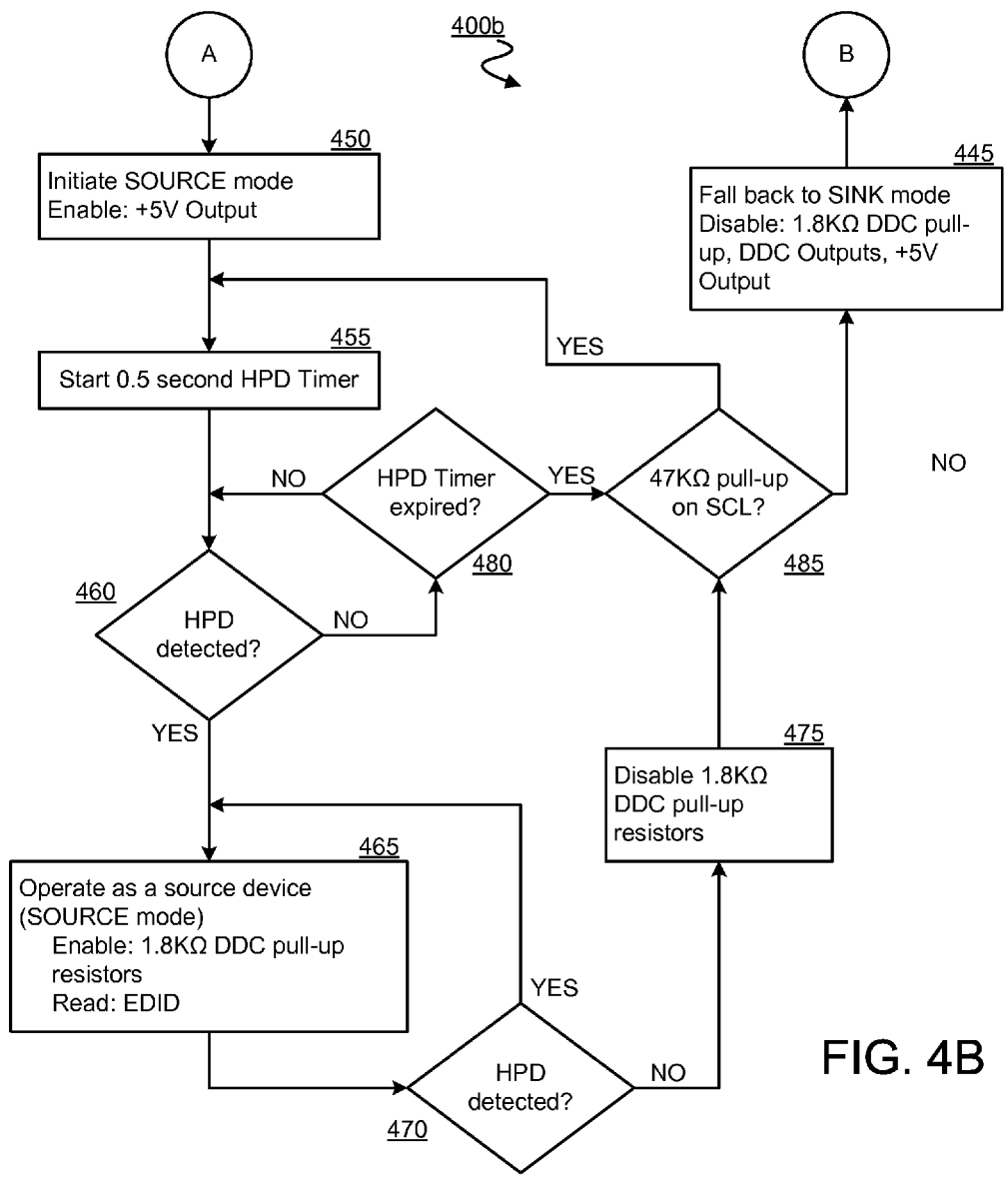
FIG. 4B is a flow diagram showing elements of a method for controlling an audio/video device according to an embodiment.

FIGS. 4A and 4B illustrate select elements of methods 400a, 400b, respectively, for controlling operation of an AV device according to an embodiment. An AV device controlled by performing either or both of methods 400a, 400b may, for example, be a device including some or all of the features of first device 110. In one embodiment, the AV device controlled by performing either or both of methods 400a, 400b may merely include some or all of the features of AV logic 112—e.g. without also including other features of first device 110 such as connector 114. Methods 400a, 400b may include some or all of the features discussed herein with respect to methods 200, 250, although certain embodiments are not limited in this regard.

FIGS. 4A and 4B are discussed herein with respect to features which are specific to HDMI interface requirements. However, such discussion may be extended to apply to requirements of any of a variety of additional or alternative interface standards for communicating AV information. For example, various additional or alternative test conditions (e.g. different delays, resistance values, signal outputs, test conditions, etc.) may be used, according to different embodiments, for determining whether and/or how one or more operation mode transitions of an AV device are to take place.

Method 400a may, at 405, initialize the AV device to SINK mode by default in response to an indication of a reset event, a power-on event or a power-off event. The initializing at 405 may, for example, include disabling one or more of a +5V HDMI output (channel 18), HPD output (pin 19), some or all DDC outputs (pins 15 and/or 16), and respective 1.8K pull-up resistors for such DDC outputs. The initializing at 405 may further include initializing extended display identification data (EDID) functionality of the AV device in preparation for identifying capabilities to any other device coupled via the connector—e.g. connector 114. After the initializing at 405, method 400 may, at 410, provide some delay—e.g. 100 ms—for a high-value pull-down resistor to discharge the +5V HDMI output. However, such delay may not be required, in certain embodiments.

After delay at 410, method 400 may test for some indication that another device is coupled to the AV device being controlled by method 400a. By way of illustration and not limitation, method 400a may test, at 415, test whether a +5V HDMI supply voltage is being provided at connector 114—indicating that a device coupled via the connector is operating in some AV Source mode. If the +5V supply voltage is detected at 415, then method 400a may, at 420, assert a HPD signal at the connector (pin 19) and, at 425, commence operation of the communication logic of the AV device in a SINK mode. The AV device may test for a change in connectivity with the other device—e.g. by occasionally testing at 430 +5V supply voltage continues to be provided at the connector by the other device. In an embodiment, detecting that the +5V supply voltage is not being so provided may result in method 400a disabling its HPD signal, its DDC output functionality and/or any other AV Sink functionality that is not currently being used. Method 400a may then return to providing the delay at 410 in preparation for again testing for presence of any connected device.

If the +5V supply voltage is not detected at 415, then method 400a may detect for the presence of any device which might be coupled via the connector and which is operating in some AV Sink mode. By way of illustration and not limitation, method 400a may test, at 440, to confirm that there is a 47 kΩ pull-up resistor on the clock channel of the connector (SCL channel 15) as required by the HDMI specification, that an impedance on the data (SDA channel 16) is not in the HDMI specified Source range of 1.51 kΩ to 2.0 kΩ, and that a receiver sense input (RSEN) signal indicates that one or more differential pairs of the connector are provided with terminators at some coupled device. If no AV Sink device is detected at 415, method 400a may then return to providing the delay at 410, in preparation for again testing for presence of any connected device.

If an AV Sink device is detected at 415, then in one embodiment, operations of method 400b may follow. For example, method 400b may, at 450, initiate a transition to SOURCE mode—e.g. including enabling the communication logic of the AV device to provide the +5V supply voltage to the connector. In an embodiment, method 400b may, at 455, start a HPD timer—e.g. set for 0.5 seconds—for timing out if a HPD signal is not detected from some AV Sink device. Method 400b may test, at 460, whether an HPD signal is detected—e.g. where the test at 460 may be successively performed according to a test at 480 of whether the HPD timer has expired. If an HPD signal is detected at 460, method 400b may begin operation of the AV device in a SOURCE mode, at 465.

If the HPD timer is determined to have expired at 480, method 400b may perform evaluations of whether one or more indications of a coupled AV Sink device are still present at the connector. By way of illustration and not limitation, method 400b may test, at 485, to confirm whether there is a 47 kΩ pull-up resistor on the clock channel of the connector (SCL channel 15) as required by the HDMI specification. If such a 47 kΩ pull-up resistor is detected at 485, method 400b may return to setting another HPD timer at 455.

If no such 47 kΩ pull-up resistor is detected at 485, method 400b may begin preparations, at 445, to transition the AV device back to a SINK mode—e.g. including disabling one or more of a +5V HDMI output (channel 18), some or all DDC outputs (pins 15 and/or 16), respective 1.8K pull-up resistors for such DDC outputs, and/or the like. After the preparation for SINK mode operation at 445, method 400b may be followed by an operation of method 400a—e.g. the providing of a delay at 410.

In an embodiment, operation of the AV device in SOURCE mode, at 465, includes enabling 1.8K pull-up resistors for DDC channels of the connector which are to serve as output channels. Additionally or alternatively, SOURCE mode operation at 465 may include performing an EDID read of the capabilities of the detected AV Sink device. Operation of the AV device in SOURCE mode may continue until a test at 470 indicates that the detected AV Sink device is no longer providing a HPD signal. If such an HPD signal is no longer detected, method 400b may begin to protect the AV device from possible harm—e.g. caused by the detected AV Sink device somehow transitioning to AV Source operation. By way of illustration and not limitation, method 400b may, at 475, disable respective 1.8 kΩ pull-up resistors for one or more DDC channels of the connector. After the disabling at 475, method 400b may perform the presence test at 485.

Figure 5:
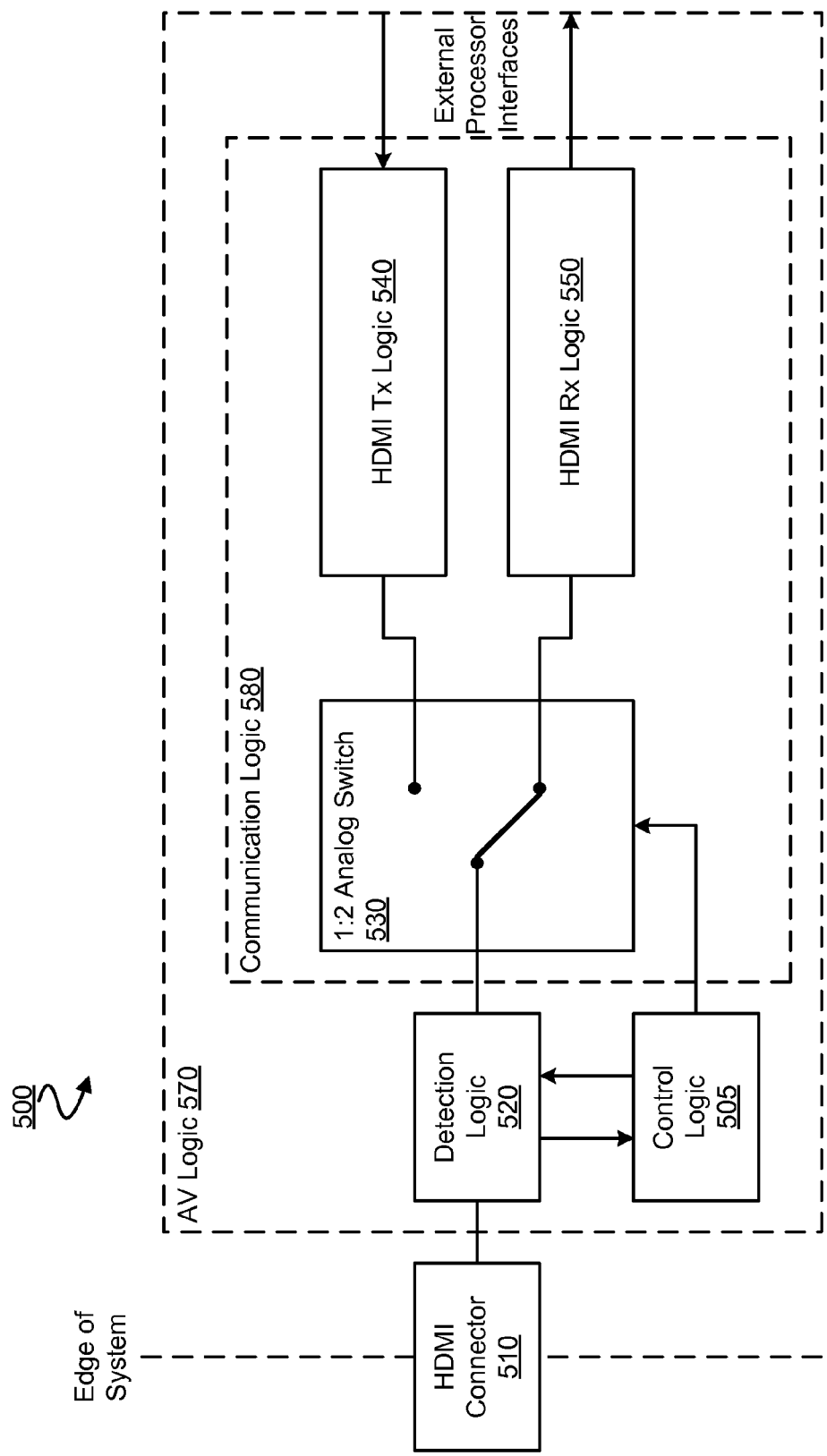
FIG. 5 is a block diagram showing elements of an audio/video device according to an embodiment.

FIG. 5 illustrates select elements of a system 500 for exchanging AV information according to an embodiment. System 500 may include some or all of the features of first device 110, for example. For example, system 500 may include AV logic 570 having some or all of the features of AV logic 112.

System 500 may include an AV connector—represented by an illustrative HDMI connector 510 at the edge of system 500—to couple system 500 to some external device (not shown) for an AV information exchange. AV logic 570 may include mechanisms to variously implement different operation modes in system 500 to accommodate different types of AV communications via HDMI connector 510. By way of illustration and not limitation, AV 570 may include control logic 505 to receive information indicating a presence or absence of one or more characteristics regarding connectivity of system 500 with some AV device via HDMI connector 510.

For example, control logic 505 may include or otherwise have access to detection logic 520 of system 500 which relays and/or analyzes signals exchanged via HDMI connector 510. In an embodiment, detection logic 520 may include one or more of logic to detect for a supply voltage output, logic to detect for a signal line termination, logic to detect for an EDID or other such identifier, logic to detect for a digital data functionality, logic to detect for a clock signal and/or the like. The particular mechanism for detection logic 520 to perform such detecting may be adapted from conventional techniques for detecting clock signals, data voltage inputs, impedances, etc., and are not limiting on certain embodiment. Although shown as being coupled along the data exchange path to intercept one or more signals exchanged via HDMI connector 510, detection logic 520 may, in an alternate embodiment, be configured to passively sense signals exchanged via HDMI connector 510.

Messages from detection logic 520 may indicate to control logic 505 whether and/or how system 500 is to transition logic of system 500 between operating modes. In an embodiment, control logic 505 may provide control functionality to variously place communication logic 580 of system 500 at different times in different ones of a plurality of operation modes—e.g. where the plurality of operation modes includes a SINK mode and a SOURCE mode. For example, control logic 505 may transition communication logic 580 between operation modes according to some or all of the techniques of method 500 and/or method 550.

By way of illustration and not limitation, control logic 505 may configure a switch of communication logic 580—represented by an illustrative analog switch 530—to switch between HDMI (or other AV interface standard) transmit logic 540 for SOURCE mode operation and HDMI (or other AV interface standard) receive logic 550 for SINK mode operation.

Control logic 505 may also provide functionality to further configure either or both of HDMI transmitter logic 540 and HDMI receive logic 550, although certain embodiments are not limited in this regard. For example, HDMI receive logic 550 may include HDMI/MHL functionality to switch between a sub-mode to receive HDMI information from another AV device and a sub-mode to receive MHL information. Control logic 505 may provide signaling (not shown) to selectively configure HDMI receive logic 550 to variously operate in such sub-modes at different times.

Techniques and architectures for configuring an AV device are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A method comprising:
    initializing a first audio/video (AV) device to operate in a default AV sink operation mode in response to a power-on-reset or powering up of the first AV device;
    detecting with control circuitry of the first AV device, a coupling between the first AV device and a second AV device;
    determining whether a first supply voltage is provided at a channel of a connector, the connector coupling the first AV device and the second AV device;
    in response to determining that the first supply voltage is provided at the channel of the connector, configuring communication logic of the first AV device to continue operating the first AV device in the AV sink operation mode;
    when operating the first AV device in the AV sink operation mode, receiving AV data provided to the first AV device via the connector and receiving power from the first supply voltage provided to the first AV device at the channel of the connector;
    in response to determining that the first supply voltage is not provided at the channel of the connector, configuring the communication logic of the first AV device to transition the first AV device from the AV sink operation mode to an AV source operation mode; and
    when operating the first AV device in the AV source operation mode, sending AV data via the connector and providing a second supply voltage at the channel of the connector.

2. The method of claim 1, wherein the default operation mode is for communication according to a high-definition multimedia interface standard.

3. The method of claim 1, wherein a first impedance is provided for a data channel of the connector in the AV source operation mode, and the first impedance is not provided for the data channel in the AV sink operation mode.

4. The method of claim 1, further comprising:
performing an AV data exchange between the first device and the second device.

5. The method of claim 4, further comprising:
detecting a change to the connectivity of the first AV device after the AV data exchange; and
in response to the detected change to the connectivity, placing the communication logic into the AV sink operation mode.

6. The method of claim 1, wherein the communication logic is further configured to transition the first AV device from the AV sink operation mode to the AV source operation mode in response to determining that an impedance at a second channel of the connector is outside a range of values.

7. The method of claim 6, wherein the range of values includes 1.5 kilo ohms and 2.0 kilo ohms.

8. An audio/video (AV) device comprising:
communication logic to couple to a connector, the communication logic including circuitry configured to implement:
an AV sink operation mode for the communication logic to receive AV data provided to the AV device at the connector and to receive power from a first supply voltage provided to the AV device via a channel of the connector, the AV sink operation mode being a default mode of operation for the AV device, and
an AV source operation mode for the communication logic to send AV data from the AV device via the connector and to provide a second supply voltage at the channel of the connector; and
control logic including circuitry to configure the communication logic to initialize the AV device to operate in the default AV sink operation mode in response to a power-on-reset or powering up of the AV device, to continue operating the AV device in the AV sink operation mode in response to determining that the first supply voltage is provided at the channel of the connector, and to configure the communication logic to transition the AV device from the AV sink operation mode to the AV source operation mode in response to determining that the first supply voltage is not provided at the channel of the connector.

9. The device of claim 8, wherein the default operation mode is for communication according to a high-definition multimedia interface standard.

10. The device of claim 8, wherein the communication logic is further configured to provide a first impedance for a data channel of the connector in the AV source operation mode and is configured to not provide the first impedance for the data channel in the AV sink operation mode.

11. The device of claim 8, further comprising:
detector logic to detect, while the communication logic is in the default operation mode, a coupling of the AV device to another AV device via the connector; and
wherein the communication logic is further configured to perform an AV data exchange with the other device in response to the detection.

12. The device of claim 8, wherein the communication logic is further configured to transition the first AV device from the AV sink operation mode to the AV source operation mode in response to determining that an impedance at a second channel of the connector is outside a range of values.

13. The device of claim 12, wherein the range of values includes 1.5 kilo ohms and 2.0 kilo ohms.

14. A system comprising:
a connector;
communication logic of an audio/video (AV) device coupled to the connector, the communication logic including circuitry configured to implement:
an AV sink operation mode for the communication logic to receive AV data provided to the system at the connector and to receive power from a first supply voltage provided to the system at a channel of the connector, the AV sink operation mode being a default mode of operation for the system, and
an AV source operation mode for the communication logic to send AV data from the system via the connector and to provide a second supply voltage at the channel of the connector; and
control logic including circuitry to configure the communication logic to initialize the AV device to operate in the default AV sink operation mode in response to a power-on-reset or powering up of the AV device, to continue operating the AV device in the AV sink operation mode in response to determining that the first supply voltage is provided at the channel of the connector, and to configure the communication logic to transition the AV device from the AV sink operation mode to the AV source operation mode in response to determining that the first supply voltage is not provided at the channel of the connector.

15. The system of claim 14, further comprising:
detector logic to detect, while the communication logic is in the default operation mode, a coupling of the system to an AV device via the connector; and
wherein the communication logic is further configured to perform an AV data exchange with the AV device in response to the detection.

16. The system of claim 15, wherein the detector logic is further configured to detect a change to the connectivity after the AV data exchange, wherein, in response to the detected change to the connectivity, the control logic further configured to place the communication logic into the AV sink operation mode.

17. The system of claim 14, wherein the communication logic is further configured to transition the first AV device from the AV sink operation mode to the AV source operation mode in response to determining that an impedance at a second channel of the connector is outside a range of values.

18. The method of claim 17, wherein the range of values includes 1.5 kilo ohms and 2.0 kilo ohms.

* * * * *